Aug. 20, 1963
F. J. CARSON ET AL
3,101,156
METHOD AND APPARATUS FOR FEEDING FLAT
SHEETS ONTO A MOVING CONVEYOR
Filed March 11, 1960
3 Sheets-Sheet 1
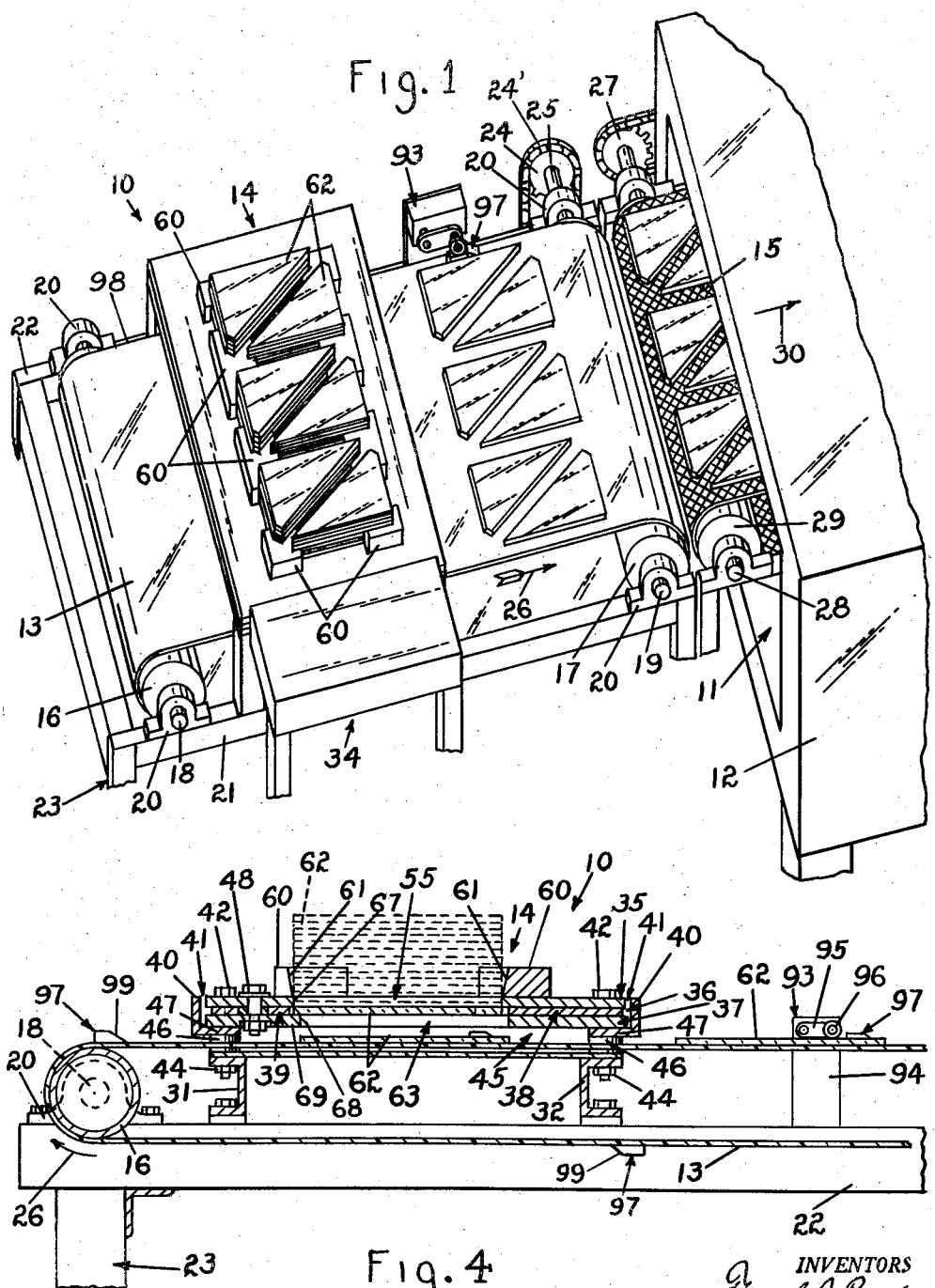
INVENTORS
Frank J. Carson
BY and Herbert A. Leflet, Jr.
Nobbe & Swope
ATTORNEYS

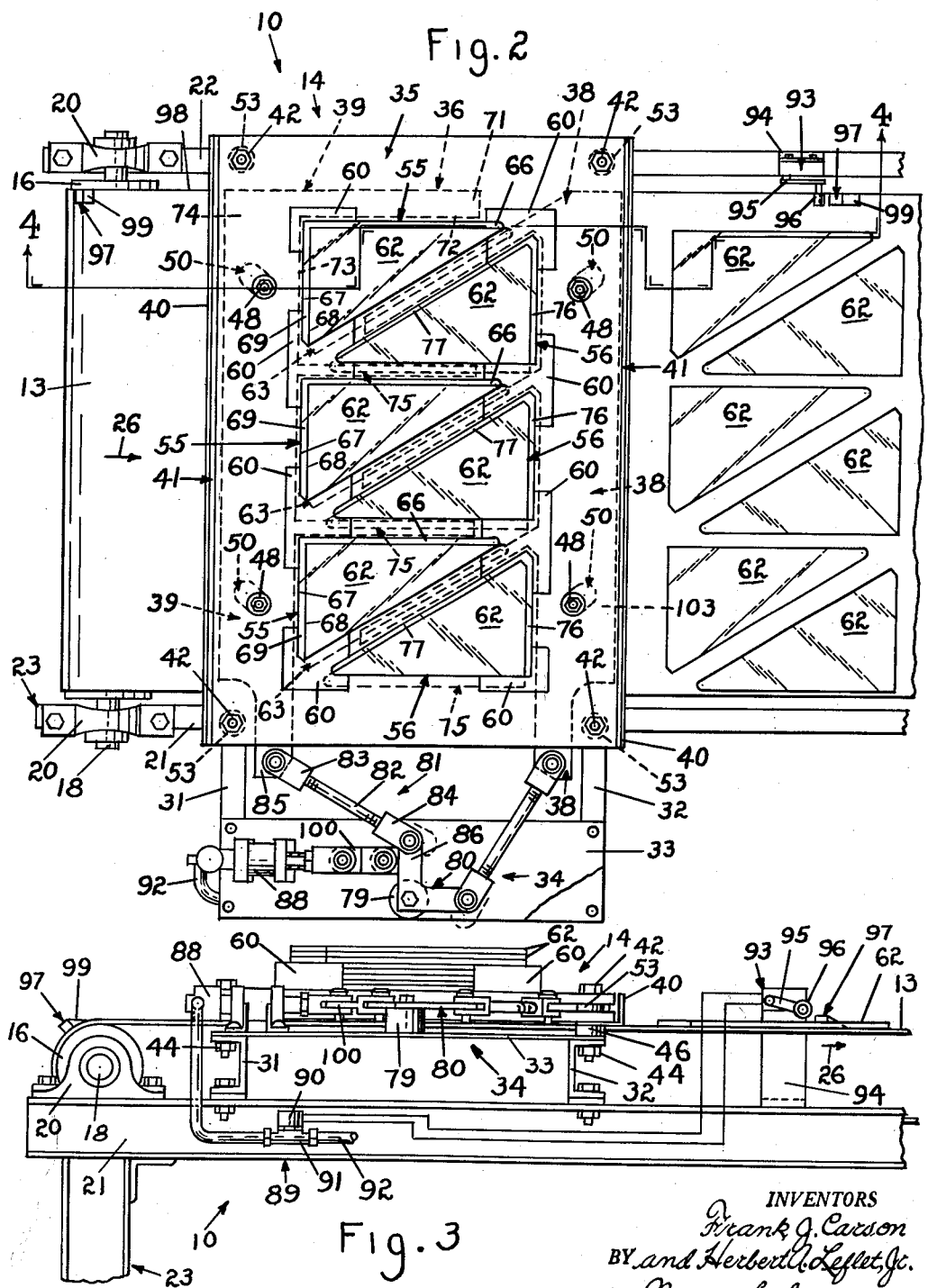

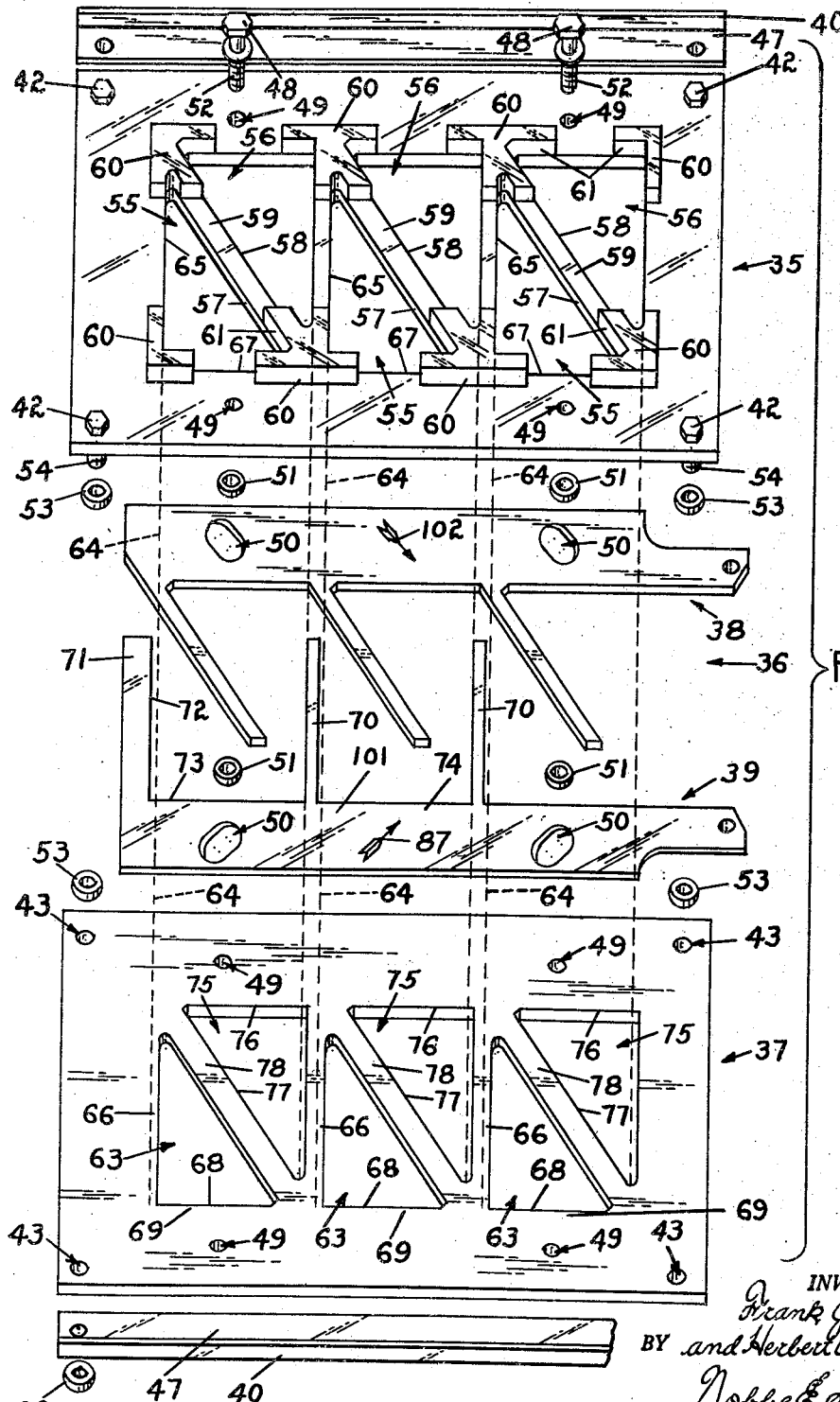

United States Patent Office 3,101,156
Patented Aug. 20, 1963

3,101,156
METHOD AND APPARATUS FOR FEEDING FLAT SHEETS ONTO A MOVING CONVEYOR
Frank J. Carson and Herbert A. Leflet, Jr., Toledo, Ohio, assignors to Libbey-Owens-Ford Glass Company, Toledo, Ohio, a corporation of Ohio
Filed Mar. 11, 1960, Ser. No. 14,400
1 Claim. (Cl. 221—93)

The present invention relates broadly to an improved method and apparatus for feeding flat sheets or plates onto a moving conveyor.

While this invention is particularly concerned with the feeding of sheets of glass to a furnace in which the sheets are tempered, and will be so described herein by way of example, it will be understood that the invention is also of utility in feeding sheets of glass or other materials into other types of treating or processing furnaces. Also, while the invention will be described herein with particular reference to feeding triangular sheets, it is also adapted for the feeding of other irregularly shaped sheets.

With the increased use of tempered glass and particularly the triangularly shaped ventilator plates of present day automobiles, it has become desirable to provide a method and apparatus which will not only automatically feed flat glass sheets of various shapes into a tempering furnace but one which will do so in timed relationship in order to maintain constant spacing between the sheets.

Therefore, according to the present invention, a plurality of triangularly shaped glass sheets are fed onto a moving conveyor in preselected groupings, with the sheets of each spaced group being in spaced alignment transversely of the conveyor. The individual groups of sheets are also spaced longitudinally along the conveyor to permit acceleration and deceleration of the groups in certain predetermined zones within a furnace. For example, the sheets moving through the preliminary zones of the furnace might be moving along a conveyor at a rate of about 100 inches per minute. During an intermediate phase these sheets might be caused to accelerate so that they would be moving through the furnace at a speed of 1000 inches per minute. When the sheets enter the final tempering or other processing phase they would again be slowed down to a speed of 100 inches per minute and it is during this latter deceleration, after the initial acceleration, that the possibility of collision between adjacent groups of sheets would arise.

Thus, the spacing between successive groups of sheets, as well as between the individual sheets of each group, is calculated to prevent collision between successive groups or sheets of each group upon deceleration in the speed of travel thereof and also so calculated that this may be done without unduly sacrificing or limiting operational efficiency.

It is therefore a primary object of the present invention to provide a novel method and apparatus for automatically and continuously feeding triangular and other irregularly shaped glass sheets onto a moving conveyor which delivers them into a furnace for tempering or other processing.

Other objects and advantages of the invention will become more apparent during the course of the following description when taken in connection with the accompanying drawings.

In the drawings wherein like numerals are employed to designate like parts throughout the same:

FIG. 1 is a top perspective view of apparatus constructed in accordance with the present invention;

FIG. 2 is a plan view of the apparatus;

FIG. 3 is a side elevation of the apparatus;

FIG. 4 is a sectional view taken along the lines 4—4 of FIG. 2; and

FIG. 5 is an exploded perspective view of the sheet feeding apparatus.

Referring now to the drawings and particularly to FIG. 1 the apparatus of the present invention comprises a loader mechanism 10 located adjacent the entrance 11 of a furnace 12. The loader 10 generally includes an endless conveyor belt 13 and a magazine feed apparatus 14. The conveyor belt 13 is aligned with a furnace conveyor belt 15 and although both conveyors are preferably independently driven as will be later described, they are located closely adjacent each other so that glass sheets or plates carried upon belt 13 will be readily transferred onto the conveyor belt 15.

The conveyor belt 13 is driven by frictional engagement with the two rollers 16 and 17 fixedly mounted to shafts 18 and 19. These shafts 18 and 19 are supported at each end in bushings 20 which are themselves fixedly secured to side bars 21 and 22 of a supporting framework 23. A sprocket gear 24 (FIG. 1) is keyed to the extending end 25 of shaft 19 and is driven from a motor (not shown) through a sprocket chain 24' so that as shaft 19 rotates it causes roller 17 to drive belt 13 in the direction of the arrow 26. A similar sprocket gear 27 is connected to shaft 28 of the roller 29 about which the furnace belt 15 passes. A second motor (not shown) is also provided to drive the gear 27 through suitable linkage, so that the furnace belt 15 travels in the direction of arrow 30.

Mounted on the framework side bars 21 and 22 and extending therebetween transverse to the path of travel of the belt 13, are cross channels 31 and 32 (FIGS. 2, 3 and 4). As seen in FIG. 2 these cross channels 31 and 32 extend beyond the side bar 21. Mounted upon the end extensions of channels 31 and 32 is a platform 33 upon which rests the actuating means 34 for operating the magazine feed 14.

Turning now to FIGS. 4 and 5, the magazine feed 14 includes three independent plates 35, 36 and 37, which, when assembled, are superimposed one upon the other. The plates 35 and 37 are of one piece construction while plate 36 includes two independent sections or members 38 and 39. When assembled in superimposed contacting relationship to form the magazine feed 14, the plate 35 is on top, plate 37 on the bottom and plate 36 interposed therebetween. Extending transversely of the conveyor belt 13 are a pair of L-shaped channels 40, adjacent to but spaced from, the transverse edges of the plates 35, 36 and 37 by a clearance space 41 (FIG. 4) to protect the plates from accidental jarring and also to strengthen and stabilize the magazine feed.

The top and bottom plates 35 and 37 respectively are stationary during the feeding operation and are joined to the framework cross bars 21 and 22 by bolts 42 passing through openings 43 in the plates and secured by nuts 44 (FIG. 4). The bottom plate 37 is properly spaced above the upper flight of the conveyor belt 13 to provide a sufficient clearance space 45 therebetween (FIG. 4), by spacers 46 and the flanges 47 of channels 40.

The members 38 and 39 constituting the intermediate plate 36 are slidable relative to the top and bottom plates 35 and 37 and constitute the feed actuating component or ejection means of the magazine feed 14. These members 38 and 39 are held in position between plates 35 and 37 by bolts 48 which pass through aligned openings 49 in plates 35 and 37 and elongated openings 50 in members 38 and 39. A bearing 51 (FIG. 5) is placed in each of the four openings 50 and the shank 52 of the respective bolts 48 passes therethrough so that the proper sliding movement of each member 38 and 39 can be achieved. Additional spacers 53 are provided about the shanks 54 of bolts 42 between plates 35 and 37 to maintain proper spacing between these two plates, so that members 38 and 39, constituting plate 36, will be movable with respect to stationary plates 35 and 37 with a minimum of frictional resistance therebetween.

With reference particularly to top plate 35 (FIG. 5) it is provided with six triangularly shaped pockets or openings 55 and 56 arranged in complementary pairs. The hypotenuse side 57 of each pocket 55 of each pair is adjacent but spaced from the hypotenuse side 58 of the other pocket 56 of each pair as determined by a diagonal rib 59. All of these openings or pockets correspond in size and shape to the configuration of the triangularly shaped pieces of glass being ejected by the magazine feed 14. Provided on the top exposed surface of plate 35 at the corners of pockets 55 and 56 are guide blocks 60 which have upwardly tapered inner side surfaces 61 (FIG. 4) to secure the glass blanks 62 when stacked therein in position and to guide them properly into the pockets 55 and 56 in plate 35.

Similar pockets are formed in bottom plate 37. For example, the pockets 63 in plate 37 are located directly beneath pockets 55 in plate 35, however, the pockets 63 are slightly out of alignment with pockets 55, as seen in FIG. 5, for a purpose to be later described. In FIG. 5, the dotted line 64 represents a superimposition of edge 65 of a pocket 55 in plate 35 onto plate 37 adjacent the corresponding edge of pocket 63 in plate 37. This misalignment exposes a portion of plate 37 to form a narrow ledge 66 (FIGS. 3 and 5) adjacent pocket 63, which ledge supports a glass sheet 62 when the sheet is inserted into guide 60 to a drop through the pocket 55 and onto the ledge 66 in plate 37.

Now as seen in FIGS. 2 and 4, this same offset is true with regard to the edge 67 of pockets 55 and edge 68 of pockets 63. That is, the edge 67 of pocket 55 when superimposed on bottom plate 37 would expose another portion of plate 37 so that a second ledge 69 will be formed thereon. These two adjacent ledges 66 and 69 provide support for the triangular glass sheets 62 along two side edges thereof, the glass being unable to move because of the weight of the stack in the guides 60. Thus glass sheets 62 placed in guides 60 would pass through pockets 55 of plate 35 and would drop onto the ledges 66 and 69 in plate 37 so that the bottom sheet would rest and be supported thereon.

As seen in FIG. 5, member 39 is L-shaped and has two spaced ribs 70 extending parallel with and being of the same length as a tongue 71. Since the function of the ribs 70 duplicates that of tongue 71, it is believed that an explanation of the action of tongue 71 will suffice as an explanation of the function of ribs 70. The edge 72 of tongue 71 is offset from the projected line 64 of edge 65 of a pocket 55 (FIG. 5) so that the glass will freely bypass the tongue 71 and will fall onto ledge 66 on plate 37 as aforedescribed. As seen in FIG. 2, the edge 73 of body portion 74 of member 39 is also offset with regard to the edge 68 of pockets 63 in plate 37. Thus movable member 39 will not impede the free fall of glass blanks from pockets 55 onto the ledges 66 and 69 of plate 37.

It should here be stated that the thickness of plate 36, i.e. members 38 and 39 is exactly the same as the thickness of the glass blanks 62 being dispensed for reasons to be now discussed.

In the aforementioned discussion only pockets 55 and 63 and their relationship to member 39 have been discussed in detail. It is to be understood however that a similar relationship exists between the pockets 56 in stationary plate 35, the associated movable member 38 and pockets 75 in stationary plate 37. In this latter case, the glass supporting ledges on plate 37 (i.e. the ledges supporting the glass sheets 62 falling through pockets 56 onto plate 37) will be formed along edges 76 and 77 (FIG. 5) of pocket 75 in plate 37. In this regard, it is noted that the diagonal rib 78 of plate 37 has a greater width than does its complementary rib 59 of plate 35. However, since the functional action of the glass sheets passing through all the pockets is the same, a comprehensive discussion to here follow will discuss only the action effecting the passage of the glass blanks 62 onto belt 13 through pockets 55 and 63. It should be understood however that the same action occurs with regard to glass blanks 62 passing onto belt 13 through pockets 56 and 75.

Generally speaking, the operation of the loading apparatus falls into three phases. These phases, under inducement of automatic controls to be later described, follow one another and determine one cycle of operation. Basically these three phases consist of first, a rest phase; second, an ejection phase; and third, a return to rest and feed phase.

Briefly and without going into specific details, in the rest phase the glass sheets 62 are positioned in stacks in complementary pairs, as aforedescribed. The bottom sheet of each stack rests in the magazine feed upon the ledges aforedescribed, i.e. the ledges formed by the offset of the pockets 63 and 75 in the bottom plate 37 from the pockets 55 and 56 in the top plate 35. In this rest position, the glass sheets are maintained in vertical alignment, the stacks are spaced from one another a predetermined distance as determined by the width of diagonal ribs 59 and the apparatus is ready for the ejection phase.

In the ejection phase, the automatic controls cause the movable plate 36 (i.e. members 38 and 39) to move in a predetermined fashion so as to cause ejection of only one glass sheet (i.e. the lowermost sheet) from each of the plurality of stacks. These glass sheets drop in groups of six onto the conveyor belt 13 and each sheet falls at the same instant in point of time as does all of the other sheets in the same group of sheets. The sheets within each group will be deposited upon the belt 13 spaced from each other a distance equal to the spacing of the stacks as determined by their stack position aforedescribed, and the distance between all successive adjacent individual groups will also be the same.

In the return to rest and feed phase, the movable members 38 and 39 return to the position they occupy when the apparatus is in its rest position and the lowermost sheet remaining in each stack drops onto the ledges in plate 37 now exposed because of the immediately preceding ejection of the glass sheet which had originally rested thereon in the preceding ejection phase.

Thus, glass sheets are automatically discharged in a manner calculated to insure continuous placement of successive groups of six glass sheets each onto a moving belt 13.

Turning now to FIGS. 2 and 3, there is shown therein the mechanical components which constitute the automatic control means 34 that govern the aforedescribed cyclic movement of the feed magazine. As best seen in FIG. 3 the automatic control means or actuating means 34 includes a pivot bearing 79 that supports a bell crank 80 for rotation. To impart motion from this bell crank 80 to member 39, for example, there is provided a turnbuckle assembly 81 including a double end externally threaded rod 82 and two internally complementary threaded links 83 and 84. One link 83 is affixed to a tab extension 85 on member 39 and the other link 84 is affixed to the arm 86 of crank 80.

Rotation, as will later be discussed, is imparted to crank 80 to cause said crank to move in a clockwise direction. This movement causes crank 80 to move from the solid line position illustrated in FIG. 2 to the broken line position also indicated in FIG. 2 and will force member 39 to move along the line of the arrow 87 in FIG. 5. This movement is accomplished by air pressure from a double-acting cylinder assembly 88 and since this cylinder assembly 88 is double-acting, it will automatically return the crank 80 to the full line position (FIG. 2).

This action is controlled by timing means 89. The timing means 89 includes a timer 90 and valve 91 connected to the air line 92. The timer 90 is actuated by a switch assembly 93 mounted onto a brace 94 on bar 22. This switch assembly 93 inclues a sprocket arm 95 having a roller 96 mounted at its lower end, the roller 96 being suspended slightly above the horizontal plane of the belt 13 or if desired riding thereon.

Integrally mounted upon conveyor belt 13 are a series of equi-spaced lugs 97 (i.e. along the edge 98 (FIG. 2) of the belt 13 adjacent switch 93). These lugs 97 actuate the switch assembly, or means, by its beveled surface 99 which when it engages a roller 96, causes rocker arm 95 to raise upwardly. Thus, as the belt 13 travels about its closed endless path, each time a lug 97 trips switch assembly 93, air cyclinder assembly 88 will be activated to impart a push and pull force to arm 86 through plunger assembly 100 and move the bell crank 80 as aforedescribed through one complete cycle. The distance between adjacent lugs 97 determines the spacing between successive adjacent groups of blanks 62 after deposit on belt 13.

As the crank 80 moves to the dotted line position (FIG. 2), the sliding member 39 moves by translating motion in the direction of arrow 87 (FIG. 5) and is guided by the elongated openings 50. This movement is in a direction which lies within the angle determined by the edges supporting the glass sheets, namely within the angle determined by ledges 66 and 69.

Now when member 39 moves from its "rest" position to its "ejection" position, the edges 72 and 73 of member 39 carry the bottom glass sheet 62 (FIG. 4) off the ledges 66 and 69 of plate 37 and the sheet drops through pocket 63 and through space 45 onto belt 13 therebelow. Since the members 38 and 39 are of the same thickness as each glass sheet 62, double feeding is prevented. In addition while the sliding members 38 and 39 eject one glass sheet from each pocket 63 and 75, the next following glass sheet is supported on the top surface 101 of ribs 70, tongue 72 and body 74 of member 39 and similar components on member 38. After slide members 38 and 39 return to their original position the next glass sheet in each stack will fall respectively down onto ledges 66 and 69 of pockets 63 and the ledges associated with pockets 75 ready for ejection upon the next actuation of slide members 38 and 39. Thus, it is again noted that similar action takes place with regard to glass sheets being passed through pockets 56 and 75. Bell crank 80 moving to its dotted position pulls the slide member 38 in the direction of arrow 102 (FIG. 5) as guided by openings 50 in body 103 of member 38. This will cause this same ejection action of blanks through pockets 56 and 75 as aforediscussed for pockets 55 and 63.

Upon continuous recycling of the actuating linkage 34, the magazine feed 14 will deposit six glass blanks upon belt 13, one through each pocket 63 and 75 in bottom or lower stationary plate 37.

In summary, in the "rest" position six glass sheets are supported along two adjacent edges, of their triangular shape, the angle between these edges being always less than 180°. When the air cylinder is actuated, it moves the actual ejection mechanism of the magazine feed to place the feed in its "ejection phase" and all six sheets are dropped simultaneously in pattern arrangement (i.e. spaced as the stack of glass sheets 62 are spaced) from the feed magazine onto a conveyor moving thereunder.

As the ejection mechanism of the magazine feed automatically returns to rest position (i.e. the device goes through the "return to rest and feed phase") six new sheets are positioned on supporting ledges in the magazine feed ready to be ejected upon the next "ejection phase." These new sheets are supported during the ejection phase to prevent double feeding on the top surface of the ejection mechanism. By proper location of timing actuators on the conveyor to trigger each cycle, proper spacing between each group of six simultaneously ejected sheets is provided.

It is to be understood that the form of the invention herewith shown and described is to be taken as an illustrative embodiment only of the same, and that various changes in the shape, size and arrangement of parts, as well as various procedural changes may be resorted to without departing from the spirit of the invention.

We claim:

An apparatus for dispensing sheets comprising, in combination, a pair of stationary plates positioned one above the other, a plurality of pockets in each of said stationary plates, each of the pockets in the lower of said stationary plates being of substantially identical configuration to a corresponding pocket in the upper of said stationary plates and offset therefrom, guide blocks on said upper plate for locating a plurality of sheets in vertical alignment with each other in individual stacks and directing the sheets into the pockets of said top stationary plate, said sheets and said pockets being triangular-shaped, said triangular-shaped pockets in both said upper and lower stationary plates being arranged in complementary pairs, a diagonal rib formed in each stationary plate to space the hypotenuse edges of the two adjacent pockets of each complementary pair from each other, a pair of ledges on said bottom stationary plate along adjacent sides of each pocket, said ledges being defined by the offset of the pockets in said bottom stationary plate from the pockets in said top stationary plate, said ledges supporting the sheets directed through said pockets in said top stationary plate by said guide means, and ejection means including a movable plate interposed between said pair of stationary plates for periodically carrying the bottom sheet of each said stack into alignment with a pocket in said bottom plate whereby said bottom sheets pass through the pocket, said movable plate including two independently movable sections, one of said sections ejecting sheets resting on the ledges adjacent one pocket of each of said plurality of pairs of pockets in said bottom stationary plate and the other movable section ejecting sheets resting on the ledges adjacent the other pocket of each of said plurality of pairs of pockets in said bottom stationary member.

References Cited in the file of this patent

UNITED STATES PATENTS

| | | |
|---|---|---|
| 1,941,992 | Makenny | Jan. 2, 1934 |
| 2,246,431 | Cochran | June 17, 1941 |
| 2,337,033 | Davis | Dec. 21, 1943 |
| 2,348,400 | Manspeaker | May 9, 1944 |
| 2,377,294 | Belada | May 29, 1945 |
| 2,415,941 | Edson | Feb. 18, 1947 |
| 2,695,125 | Bowen | Nov. 23, 1954 |
| 2,947,444 | Taylor | Aug. 2, 1960 |